United States Patent [19]
Slonimsky et al.

[11] 3,717,469
[45] Feb. 20, 1973

[54] GRANULAR PROTEIN CONTAINING FOOD PRODUCT RESEMBLING THE NATURAL CAVIAR OF STURGEON, SALMON AND OTHER FISH, AND A METHOD OF PREPARING SAME

[75] Inventors: Grigory Lvovich Slonimsky; Vladimir Borisovich Tolstoguzov; Vera Alexandrovna Ershova; Dmitry Borisovich Izjumov, all of Moscow, U.S.S.R.

[73] Assignee: Ordena Lenina Institut Elementoorganischeskikt Soedineny, Moscow, U.S.S.R.

[22] Filed: Jan. 12, 1970

[21] Appl. No.: 2,355

[52] U.S. Cl. ..............................99/14, 99/1, 260/112
[51] Int. Cl. .................................................A23j 3/00
[58] Field of Search..............99/14, 17, 131, 18, 132; 260/112

[56] References Cited

UNITED STATES PATENTS 3,589,910  6/1971  Nesmeyanov ............................99/14
3,499,379  3/1970  Mesmeyanov et al..................99/234
2,992,925  7/1961  Green......................................99/131

FOREIGN PATENTS OR APPLICATIONS 15,088  6/1961  Japan.........................................99/14

Primary Examiner—Raymond N. Jones
Assistant Examiner—Roger B. Andewelt
Attorney—Waters, Roditi, Schwartz & Nissen

[57] ABSTRACT

The present invention relates to granular food products resembling the natural caviar of sturgeon, salmon and other fish, and to a method of preparing same.

According to the present invention the product contains an aqueous colloidal solution of proteins, gelatin, ions of alkaline earth metals, polysaccharides capable of forming ionotropic gels when interreacting with the above-said ions, and vegetable tannins, preferably tannides, the products resulting from the interreaction of polysaccharides with ions of metals, and of vegetable tannins with proteins being contained in the membrane or pellicle of the granules.

13 Claims, No Drawings

GRANULAR PROTEIN CONTAINING FOOD PRODUCT RESEMBLING THE NATURAL CAVIAR OF STURGEON, SALMON AND OTHER FISH, AND A METHOD OF PREPARING SAME

The product obtainable according to the present invention is featured by an improved strength of the superficial membrane or pellicle of the granules, a high heat-resistance of the latter and a longer storage period of the product.

A method of preparing said product has been developed which makes it possible to decrease food substance wastage from the granules.

The essence of the method consists in the treatment of the granules containing polysaccharides which are capable of forming ionotropic gels, with the solutions of the salts of at least bivalent metals.

The present invention relates to food products, and more specifically to granular food products, which resemble the natural caviar of sturgeon, salmon and other fish, and to a method for their preparation.

There is known presently a synthetic granular caviar as per the following application Ser. Nos. 619599 for U.S.A., now U.S. Pat. No. 3,499,379; 976031 for Canada; 17029/66 for Sweden; 515337/66 for United Kingdom; 85547/66 for Japan; 1692683.3 for FRG; and French patent No. 1502970 Cl.A23g granted on Oct. 16, 1967, the granules of said synthetic caviar containing aqueous solution or suspension of proteins, gelatin and vegetable tannins, preferably tannides which are contained mostly in the superficial layer of a granule, said layer being essentially a membrane or pellicle enclosing the solution (suspension) of proteins or of protein-containing foodstuffs.

Known in the present state of the art is also a method of preparing a product resembling natural caviar as disclosed in the Applications enlisted hereinabove, said method consisting in that proteins of animal or vegetable origin such as casein, are dissolved in an aqueous alkaline solution, whereupon a concentrated aqueous solution or suspension of these proteins is prepared and then mixed with some gel-forming agents such as gelatin; thereafter into the mixture are introduced glycerine and lipids and the resultant composition is mechanically agitated.

The initial stock thus obtained is shaped into granules in a water-immiscible liquid such as vaseline oil, wherefrom said granules are separated as they appear and are then washed with water.

The granules thus formed are treated with aqueous extracts of tannins to obtain edible elastic pellicles on the granule outer surface, after which the granules are water-washed to eliminate the tanning liquor residues and dyed in colors imitating those of the natural caviar of sturgeon or salmon fish, by using food colors such as ferric salts of edible acids for imitation of the sturgeon caviar color, and enolic or annatto dyes for imitation of the salmon caviar color.

Then the dyed granules are washed to remove dye residues and then subjected to culinary treatment for which purpose the granules are mixed with common salt and flavoring agents upon which the taste and smell of every particular natural foodstuff are dependent.

However, some difficulties have arisen with the above-disclosed product prepared by these methods, said difficulties result from a relatively low mechanical strength of the granule pellicle and with the tendency of the pellicles to fuse at temperatures above 25° C.

In the product obtained by the former method, a diffusion of protein from the granules into water has also been observed in the course of washing procedure which resulted in a substantial loss of protein amounting to 30 weight per cent thereof.

The herein-disclosed granular protein-containing food product of the present invention features a relative deformation 1.5 to 2 times lower than that of the above-mentioned products, is not liable to fuse at a temperature up to 50° C and can be stored for a two months.

The now-proposed method of preparing the product makes it possible to reduce the protein loss to 10 percent.

It is an object of the present invention to provide a granular protein-containing food product resembling the natural caviar and featuring the high mechanical strength of the pellicle of the granules thereof.

It is another object of the present invention to provide a protein-containing food product featuring its melting point lying above 50° C which fact is conducive to increasing its storage period up to two months.

It is still another object of the present invention to develop a method for preparing a granular protein-containing food product from proteins of vegetable or animal origin, said method providing the formation of a pellicle of the granules of high mechanical strength, heat-resistance and capable of a lengthy storage period.

These and other objects are accomplished due to the provision of a granular protein-containing food product the chief component of which is an aqueous solution or suspension of proteins.

According to the invention the granules contain an aqueous solution of protein, gelatin, bivalent ions of alkaline earth metals, polysaccharides capable of forming ionotropic gels when interreacting with the aforesaid ions of alkaline earth metals, and vegetable tannins, preferably tannides.

The products resulting from the reaction of polysaccharides with the ions of metals, and the reaction of vegetable tannins with the proteins are contained in the superficial layer of the granules, said layer being essentially a membrane or pellicle enclosing the aforesaid solution or suspension.

The granules include water-soluble sodium alginate, potassium alginate, ammonium alginate or low-ester pectin at an ester value of up to 40 per cent as the polysaccharide capable of forming ionotropic gels when interreacting with the solutions of the salts of the bivalent metals.

The granules also may contain carbohydrates, preferably starch, dextrin, agar-agar, either separately or in combinations. Additionally, the granules of the present protein-containing food product may contain vegetable oil.

According to the invention the granules of the present protein-containing food product can contain food colors, thus for coloring the granules a dark-grey use is made of ferric salts of edible acids, preferably ferric lactate, whereas for coloring the granules an orange-red enolic or annatto dyes are employed.

The herein-disclosed product may also contain vegetable oil, for example, corn oil or cotton-seed oil. Proteins and aromatizers may be dispersed in said vegetable oil. Lecithin may also be used as an emulsifier for the proteins and aromatizers as flavoring agents the present synthetic caviar preferably contains cod-liver oil and herring juice.

The product may contain, if desired, also common salt and a preservative such as sorbic acid, as well as monosodium glutamate which intensifies the flavor of the present caviar Vitamins and microelements such as ascorbic acid may also be included.

The method of this invention for obtaining the afore-discussed granular protein-containing food product, uses a mixed gel of gelatin (3 – 10 weight per cent) and calcium pectinate or calcium alginate (0.2 – 5 wt pct), or else the alginates and pectinates of other bivalent metals.

As a medium for the formation of the granules use is made of a cooled edible oil that is immiscible with water, such as vaseline oil, corn oil, sunflower oil, cotton-seed oil, or some other oils.

In the edible oil, the drops of the initial mixed gel solution assume a regular spherical shape due to forces of surface tension, and are then cooled down to acquire gel-like structure.

The gel-like granules thus obtained are in effect a mixed granulated gel containing a solution or dispersion of food substances gelatin and a solution of water-soluble alginates or pectins (such as sodium, potassium, or ammonium alginate or else pectin at an ester value of up 40 per cent).

With a view to obtaining ionotropic gel of polysaccharide and to increasing thus the mechanical strength of the granule membranes or pellicles and the temperature resistance thereof, and to prevent the granules from subsequently swelling, the gel-like granules are placed into a fixing solution and maintained there for a period of time with continuous stirring, said fixing solution comprising an aqueous solution of a salt of at least a bivalent metal (such as calcium chloride or calcium acetate).

The fixing solution may be either neutral or acid.

An acid fixing solution is obtained by adding to a neutral solution of said salt an edible acid such as acetic or hydrochloric acid to acidify the solution to pH 2–7, preferably from 2 to 4.5.

The fixing solution preferably contains 0.1 – 20 weight per cent of the salts of the bivalent alkaline earth metals, and also may contain the salts of alkali metals, e.g., potassium or sodium, in a quantity of 0 – 5 per cent and an additive of glycerine in an amount of 0 – 10 per cent which is conducive to the formation of an adequate polysaccharide gel of calcium alginate and calcium pectinate. Since the gels of calcium alginate and calcium pectinate are do not swell in acid media nor melt when heated unlike the thermoreversible gels of gelatin the granules obtained by the method of this invention which, are in effect the granules of a mixture of the gel of gelatin and that of calcium pectinate or calcium alginate. These therefore are practically free from swelling in acid and neutral media and are melt-resistant when moderately heated (up to 50° C and above).

These granules of a mixed gel of the proteinaceous (gelatin) and polysaccharide (calcium alginate or pectinate) nature may contain a considerable amount of nutritive matter (from 5 to 30 per cent, preferably within 12 and 25 per cent) in solution emulsion or suspension. Losses of water-soluble nutritive matter due to diffusion into the surrounding medium are drastically reduced, this being due to the fact that many of the proteic substances such as casein or the protein of soya bean, are liable to coagulate in the granules and form fine dispersions when the granules are treated in the fixing solution of the salts of the non-toxic alkaline bivalent earth metals, e.g., calcium.

The above-discussed feature of the method disclosed herein is a further advantage thereof.

The thus-obtained granules are then subject to further treatment with an aqueous extract of vegetable tannins to form digestible elastic membranes or pellicles on the surface of the granules, after which they are washed free from the tanning liquor residues; and then if desired dyed to imitate the colors of the natural caviar of sturgeon or salmon fish by using food colors.

In the former case use may be made of ferric salts of edible acids such as ferric lactate, ferric malate or ferric chloride, in the latter case, of enolic or annatto dyes. The granules obtained are essentially the granules of a mixed gel of the desired particle size, covered by a dyed elastic membrane or pellicle, containing nutritive substances, in non-melting and non-swelling, palatable from and having a delicate taste. The granules may then be subjected to culinary treatments by mixing them with common salt, flavoring agents and aromatizers to import the taste and flavor of the particular natural product. To impair to the product the taste and flavor peculiar to natural caviar, monosodium glutamate, sodium inosinate, cod-liver oil and herring juice are added thereto.

The above-listed additives may be introduced directly into the vegetable oil which is poured over the finished product in an amount of 3 – 15 per cent (preferably 5 – 12 per cent) to improve its food value and to prevent it from being dried too quickly.

To impart to the bulk of the finished product a sticky or glutinous consistency, to the vegetable oils poured over the grannules of the finished product may be added dispersed solutions of proteins or polysaccharides in the presence of stablilizing agents. Thus, there may also be dispersed in the vegetable oil, 20 per cent of casein in the present of 0.1 – 0.5 wt pct of lecithin, or pectin.

The strength and caloric content of the granules of the synthetic caviar can be further improved at the initial stage of its preparation by adding into the initial components other polysaccharides such as soluble starch, dextrin, etc. in the form of a solution or dispersion.

Used as the initial valuable proteins, protein-containing food products or the substances of the proteinaceous nature are pure proteins such as casein, albumin, proteins of soya bean, fish, yeast, sea-weeds, protein hydrolizates, dispersed proteic matter, proteins of milk, green leaves, of oilcakes and oil-bearing crops, and concentrated decoctions of foodstuffs.

In accordance with the above description, for the preparation of 1 kg of the finished protein-containing product resembling the natural caviar, it is necessary to combine the following components (in grams), water not being taken into account:

| | |
|---|---|
| 1. Protein | 50 – 300 |
| 2. Gelatin | 30 – 100 |
| 3. Carbohydrate | 0 – 100 |
| 4. Polysaccharides capable of | |

| | |
|---|---|
| forming ionotropic gels | |
| 5. Salt of bivalent alkaline earth metals | 2 – 50 |
| 6. Vegetable oil | 2 – 50 |
| 7. Common salt | 30 – 300 |
| 8. Cod-liver oil | 20 – 100 |
| 9. Lecithin | 10 – 30 |
| 10. Sorbic acid | 0 – 10 |
| 11. Ascorbic acid | 0.1 – 2.0 |
| 12. Tannides | 0.1 – 2.0 |
| 13. Monosodium glutamate | 0.1 – 15 |
| 14. Sodium inosinate | 0 – 20 |
| 15. Herring juice | 0 – 20 |
| 16. Food dyes selected from the group containing the ferric salts of edible acids, enolic and annatto dyes | 0 – 50 |
| | 0.1 – 2.0 |

The protein-containing food product obtainable according to the present invention has granules whose consistency, shape, color and lustre closely resemble the natural caviar of sturgeon or salmon fish. The individual granules of the synthetic caviar are in fact homogeneous in size and color, semi-transparent or opaque granules of a mixed gel of the proteinaceous (gelatin) and polysaccharide (calcium alginate or pectinate) nature, contained in an elastic digestible membrane or pellicle. The granules are not liable to melt when heated up to 50° C and above. The consistency of the finished product ranges from glutinous or sticky to high-quality friable or grainy. The product is recommended to be stored at a temperature of from –2° to +5° C.

Given below are examples of preparing a granular protein-containing food product by using the method disclosed herein.

Example 1. For the preparation of 1 kg of the finished product resembling the natural caviar of sturgeon, 150 – 200 g of casein are dissolved in 100 ml of 0.1 N solution of NaOH at 50°– 60° C with continuous stirring for a period of 1.5 to 2 hrs until completely dissolved. Then in the obtained protein solution are added 35 – 50 g of gelatin and 10 – 20 g of pectin at an ester value of about 25 per cent, the solution being continuously stirred and heated up to 40° – 50° C. The obtained warm solution is then subject to shaping into drops in corn oil. The upper layer of the oil is constantly heated up to 20° – 40° C while the lower layer is continuously cooled down to 0° – 12° C. Under such conditions the drops of the product are urged to move downwards to the cooled corn oil, thus assuming a regular spherical shape, and to congeal. As fast as the congealed granules appear they are extracted from the oil, washed out by water at a temperature of from 0° to 15° C and placed in a fixing solution where they are kept for 2 – 15 min at 0° – 10° C with continuous stirring.

The fixing solution is essentially a 4-per cent solution of calcium acetate acidified with acetic acid to pH 2.8. The jelly-like granules treated with the fixing solution are then maintained during 20 – 30 min at 0° – 10° C in an aqueous extract of vegetable tannins under continuous stirring. The tanning extract is prepared by infusing or decocting 10 g of tea leaf in 200 ml of water.

The membrane-covered granules of a mixed gel containing dispersed casein are then washed with cold water and treated with a 0.1 – 0.5 per cent solution of ferric chloride during 0.5 to 2 min until obtaining the color imitating that of the caviar of sturgeon. The dyed granules are washed with water to make them free from the residues of the ferric salt solution. Thereupon to the granules obtained are added 30 – 60 g of common salt, 2 – 5 g of monosodium glutamate, 0.01 – 1 g of sodium inosinate and 40 – 100 of cotton-seed oil, the product being under continuous stirring.

Prior to its addition, to the cottonseed oil it are added cod-liver oil or herring juice at a rate of 0.5 – 2 g and 0.5 – 15 g per 100 – 200 g of oil, respectively, these components, as it has been pointed out above, imparting a distinctive flavor to the product.

To prevent premature deterioration of the product preservatives of an antiseptic nature may be added.

Example 2. For the preparation of 1 kg of a granular protein-containing food product resembling the natural caviar of salmon fish, 100 – 150 g of casein and 50 – 100 corn starch are dissolved in 100 ml of 0.1 N solution of NaOH at 50° – 60° C with continuous stirring until complete dissolution.

To the obtained protein solution are added 20 – 40 g of gelatin and 2 – 20 g of sodium alginate, the solution being continuously stirred and heated up 40° – 50° C.

The warm solution prepared is subject to shaping into drops in cotton-seed oil. The upper layer of the oil is continuously heated up to 20° – 40° C. while the lower layer thereof is continuously cooled down to 0° – 12° C. Under these conditions the drops of the product are urged to move downwards to the cooled cottonseed oil, thus assuming a regular spherical shape, and to congeal. As fast as the congealed granules are formed they are extracted from the oil, washed with water at a temperature 15° – 20° C and placed in a fixing solution (a 10-per cent solution of calcium chloride) where the granules are to be kept for 5 – 30 min at 2° –20° C with continuous stirring.

The jelly-like granules treated with the fixing solution are then maintained for 20 – 30 min in an aqueous extract of tannides at 0° – 10° C with continuous stirring.

The membrane-covered granules are treated with enolic dyes to impart to them the color imitating that of the caviar of salmon fish.

Added to the dyed granules are 20 – 60 g of common salt, 2 – 5 g of monosodium glutamate, 0.01 – 1 g of sodium inosinate and 10 – 80 g of a 1:5-mixture of olive and corn oils, the product being under continuous stirring.

Prior to adding the above oil mixture there are added to it codliver oil or herring juice at a rate of 0.5 – 2 g and 0.5 – 15 g per 100 – 200 g of oil mixture, respectively.

Permissible antiseptic preservatives may also be added to the finished product.

What is claimed is:

1. A granular protein-containing food product resembling natural caviar comprising, in granular subdivided form, an aqueous colloidal solution of proteins; gelatin in an amount ranging from 3 to 10 per cent by weight (dry basis); water soluble edible salts of alkaline earth metals capable of forming bivalent metal ions in aqueous solution; polysaccharides in an amount ranging from 0.1 to 5.0 per cent by weight (dry basis) capable of forming ionotropic gels when reacted with aqueous solutions of said edible salts; and vegetable tannins; the product, in granular form, being characterized by having a coating resulting from the reaction of said polysaccharides with said ions and of said vegetable tannins with gelatin and protein on the outer surface of said granules to form a layer, said layer comprising a membrane or pellicle enclosing and containing said aqueous colloidal solution of proteins.

2. A granular protein-containing food product as claimed in claim 1, wherein sodium alginate is the polysaccharide.

3. A granular protein-containing food product as claimed in claim 1, wherein potassium alginate is the polysaccharide.

4. A granular protein-containing food product as claimed in claim 1 wherein ammonium alginate is the polysaccharide.

5. A granular protein-containing food product as claimed in claim 1, wherein a low-ester pectin, of an ester value of up to 40 per cent, is the polysaccharide.

6. A granular protein-containing food product as claimed in claim 1, containing per kg of the finished product the following components (in grams), water not being taken into account:

| | |
|---|---|
| protein | 50 – 300 |
| gelatin | 30 – 100 |
| carbohydrate | 0 – 100 |
| polysaccharides capable of forming ionotropic gels | 2 – 50 |
| salt of alkaline earth metals | 2 – 50 |
| vegetable oil | 30 – 300 |
| common salt | 20 – 100 |
| cod-liver oil | 10 – 30 |
| lecithin | 0 – 10 |
| sorbic acid | 0.1 – 2.0 |
| ascorbic acid | 0.1 – 2.0 |
| tannides | 0.1 – 15 |
| monosodium glutamate | 0 – 20 |
| sodium inosinate | 0 – 20 |
| herring juice | 0 – 50 |
| ferric slat of edible acids | 0.1 – 2.0 |

7. A granular protein-containing food product as claimed in claim 1, containing per kg of the finished product the following components (in grams), water not being taken into account:

| | |
|---|---|
| protein | 50 – 300 |
| gelatin | 30 – 100 |
| carbohydrate | 0 – 100 |
| polysaccharides capable of forming ionotropic gels | 2 – 50 |
| salt of alkaline earth metals | 2 – 50 |
| vegetable oil | 30 – 300 |
| common salt | 20 – 100 |
| cod-liver oil | 10 – 30 |
| lecithin | 0 – 10 |
| sorbic acid | 0.1 – 2.0 |
| ascorbic acid | 0.1 – 2.0 |
| tannides | 0.1 – 15 |
| monosodium glutamate | 0 – 20 |
| sodium inosinate | 0 – 20 |
| herring juice | 0 – 50 |
| enolic dye | 0.1 – 0.5 |

8. A granular protein-containing food product as claimed in claim 1, containing per kg of the finished product the following components (in grams), water not being taken into account:

| | |
|---|---|
| protein | 50 – 300 |
| gelatin | 30 – 100 |
| carbohydrate | 0 – 100 |
| polysaccharides capable of forming ionotropic gels | 2 – 50 |
| salt of alkaline earth metals | 2 – 50 |
| vegetable oil | 30 – 300 |
| common salt | 20 – 100 |
| cod-liver oil | 10 – 30 |
| lecithin | 0 – 10 |
| sorbic acid | 0.1 – 2.0 |
| ascorbic acid | 0.1 – 2.0 |
| tannides | 0.1 – 15 |
| monosodium glutamate | 0 – 20 |
| sodium inosinate | 0 – 20 |
| herring juice | 0 – 50 |
| annatto dye | 0.1 – 2 |

9. A method of preparing a granular protein-containing food product comprising the steps of preparing a solution of edible proteins; mixing said solution with gelatin and polysaccharides capable of forming ionotropic gels when reacted with solutions of salts of alkaline earth metals; introducing said mixture into a vessel containing an edible oil to form droplets of said mixture in said oil, the temperature of said oil, at least in the lower portions of said vessel being maintained below the melting point of said mixture to congeal said droplets; separating and washing the thus formed congealled droplets or granules free from oil; treating the granules with a solution containing a salt of an alkaline earth metal to set the outer portions of the granules and then treating the granules with aqueous extracts of vegetable tannins to form membranous coatings thereon.

10. A method of preparing a granular protein-containing food product as claimed in claim 9, whereby said salt solution comprises a solution of calcium acetate.

11. A method of preparing a granular protein-containing food product as claimed in claim 9, wherein said solution comprises a solution of calcium chloride.

12. A method of preparing a granular protein-containing food product as claimed in claim 9, wherein said solution comprises an acid solution of calcium acetate.

13. A method of preparing a granular protein-containing food product as claimed in claim 9 wherein said solution comprises an acid solution of calcium chloride.

* * * * *